Figure 1:
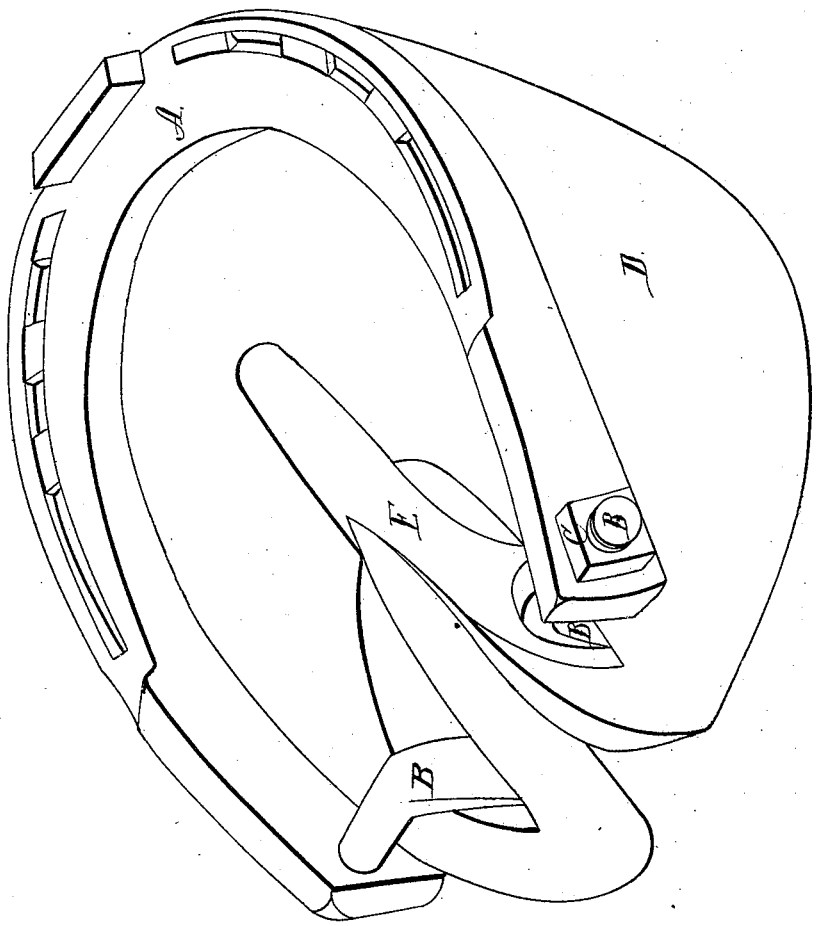

W. C. Hubbard,
Horseshoe.

N°. 20,713.  Patented June 29, 1858.

Witnesses:
W. H. Forbush
E. B. Forbush

Inventor:
W. C. Hubbard

UNITED STATES PATENT OFFICE.

W. C. HUBBARD, OF RANDOLPH, NEW YORK.

IMPROVEMENT IN HORSESHOES.

Specification forming part of Letters Patent No. 20,713, dated June 29, 1858.

*To all whom it may concern:*

Be it known that I, WILLIAM C. HUBBARD, of Randolph, in the county of Cattaraugus, in the State of New York, have invented a new and Improved Hoof-Expanding Horseshoe; and I do hereby declare that the following is a full and exact description thereof, reference being had to the accompanying drawings, and to the letters of reference marked thereon.

The nature of my invention relates to making a stiff and rigid shoe which shall be wider at the heel than the horse's hoof is, upon which it is to be used, and in combining therewith two hooks (which hooks also include a shank and screw-nut on the end thereof,) the hooks catch or hook onto the crust of the hoof, and by means thereof the hoof may be gradually drawn outwardly toward the shoe.

To enable others skilled in the art to make and use my invention, I will proceed to describe its construction and operation.

Figure 1 is a perspective of the shoe and hooks as connected with the hoof.

A represents the shoe. It is made heavy and somewhat wider at the heel than the hoof is upon which it is to be used, and is also made sufficiently stiff and unyielding as not to materially spring or bend inwardly when the nuts are turned in order to spread or expand the hoof.

B represents the hook. This has a shank of sufficient length to pass through the thick heel part of the shoe, and receive a nut on the end thereof, and with sufficient length of screw to admit of the necessary expansion of the hook. The hook catches over or hooks onto the crust or hard part of the hoof. It does not touch the soft part of the foot. The shoe is nailed to the hoof near the toe, leaving the heel free to be drawn outwardly or expanded by the hook and screw.

C is the screw-nut on the shank end of the hook; D, crust or hard part of the hoof; E, frog.

The nuts may be turned a little every day, and the hoof gradually expanded as the circumstances of the case may require and until a cure is effected.

This shoe may be worn with ease and freedom to the horse's foot, and in practice will be found to act efficiently as a preventive against and as a cure for inflammation, fever, and contraction of a horse's foot.

What I claim as my invention is—

The combination of the hooks B, (the screw-nut C being considered as a part thereof,) with the stiff unyielding shoe A, for the purposes as herein set forth.

W. C. HUBBARD.

Witnesses:
W. H. FORBUSH,
F. L. BALDWIN.